(12) United States Patent
Matsuo et al.

(10) Patent No.: US 7,762,489 B2
(45) Date of Patent: Jul. 27, 2010

(54) SPOOL FOR SPINNING REEL

(75) Inventors: Shingo Matsuo, Sakai (JP); Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/414,647

(22) Filed: Mar. 30, 2009

(65) Prior Publication Data

US 2009/0272831 A1 Nov. 5, 2009

(30) Foreign Application Priority Data

Apr. 30, 2008 (JP) .................... 2008-118674

(51) Int. Cl.
*A01K 89/00* (2006.01)
(52) U.S. Cl. ...................... 242/321; 242/322
(58) Field of Classification Search ............... 242/310, 242/311, 319, 321, 322
See application file for complete search history.

(56) References Cited

U.S. PATENT DOCUMENTS

| 3,693,901 | A | * | 9/1972 | Lilland et al. ............... 242/318 |
| 4,770,363 | A | * | 9/1988 | Tsunoda et al. ............. 242/241 |
| 5,078,334 | A | * | 1/1992 | Zanon ........................ 242/322 |
| 5,160,099 | A | * | 11/1992 | Furomoto .................... 242/321 |
| 5,358,196 | A |   | 10/1994 | Kawabe |
| 5,871,165 | A | * | 2/1999 | Shinohara et al. ........... 242/321 |
| 6,073,870 | A | * | 6/2000 | Shinohara et al. ........... 242/241 |
| 6,874,718 | B1 | * | 4/2005 | Chang ........................ 242/246 |
| 6,880,777 | B2 | * | 4/2005 | Sugawara .................... 242/322 |
| 6,938,847 | B1 | * | 9/2005 | Yeh ............................ 242/322 |
| 6,978,957 | B2 | * | 12/2005 | Sugawara .................... 242/322 |
| 6,981,668 | B2 |   | 1/2006 | Ochiai |
| 7,188,795 | B2 | * | 3/2007 | Maeder ...................... 242/322 |
| 7,222,810 | B1 |   | 5/2007 | Littau |
| 2002/0117570 | A1 | * | 8/2002 | Kitajima et al. ............. 242/322 |
| 2002/0170997 | A1 | * | 11/2002 | Furomoto .................... 242/246 |
| 2003/0001035 | A1 | * | 1/2003 | Hitomi ....................... 242/322 |
| 2005/0056715 | A1 | * | 3/2005 | Chang ........................ 242/246 |

FOREIGN PATENT DOCUMENTS

EP 1479292 A2 11/2004
JP A-2000-139286 5/2000

* cited by examiner

*Primary Examiner*—Evan H Langdon
(74) *Attorney, Agent, or Firm*—Shinjyu Global IP

(57) ABSTRACT

A spool for a spinning reel is attached to a non-circular portion formed on a tip of a spool shaft. The spool shaft moves back and forth but is prevented from rotating with respect to a reel unit. The spool includes a spool unit and a bearing member. The spool unit includes a bobbin trunk and a drag accommodation part. The bobbin trunk is capable of winding a fishing line around its outer periphery. The drag accommodation part is formed on the inner peripheral side of the bobbin trunk. The bearing member is a tubular member made of synthetic resin. The bearing member rotatably supports the spool unit. The bearing member is arranged on the inner peripheral side of the bobbin trunk. The bearing member has an engagement hole non-rotatably engaged with the non-circular portion of the spool shaft.

5 Claims, 7 Drawing Sheets

SPOOL FOR SPINNING REEL

CROSS-REFERENCE TO RELATED APPLICATIONS

This application claims priority under 35 U.S.C. §119 to Japanese Patent Application No. 2008-118674 filed on Apr. 30, 2008. The entire disclosure of Japanese Patent Application No. 2008-118674 is hereby incorporated herein by reference.

BACKGROUND OF THE INVENTION

1. Field of the Invention

The present invention generally relates to a spool, and more specifically to a spool for a spinning reel to be attached to a non-circular portion formed on a tip of a spool shaft allowed to move back and force but prevented from rotating with respect to a reel unit.

2. Background Information

In a spinning reel, especially in a front-drag spinning reel, a non-circular portion is formed on a tip of a spool shaft for applying the drag force to a spool. More specifically, the non-circular portion includes parallely opposed sides. Regarding the front-drag spinning reel, the spool shaft is allowed to move back and forth with respect to a reel unit, but is prevented from rotating with respect to the reel unit. Also, the spool is capable of rotating with respect to the spool shaft. Additionally, the spool is configured to be braked by a drag mechanism when a fishing line is reeled out.

For example, Japanese Patent Application Publication No. JP-A-2000-139286 discloses a spool for the front-drag spinning reel. According to the publication, a ball bearing is arranged between a spool shaft and the spool for smoothing rotation of the spool in a line-releasing direction when the drag force is applied to the spool.

Also, the spool for the spinning reel conventionally includes a spool unit, a tubular member, and a pair of ball bearings. The tubular member is rotatably attached to a non-circular portion of the spool shaft. The ball bearings are attached to the tubular member through a predetermined space. The ball bearings also rotatably support the spool unit. Furthermore, the tubular member is prevented from rotating and moving back and forth with respect to the spool shaft by means of a screw member penetrating the non-circular portion of the spool shaft.

With the configuration, wobble does not easily occur between the spool shaft and the spool unit. Accordingly, the spool is capable of smoothly rotating when the drag force is applied to it.

According to the above-mentioned conventional configuration, the tubular member provided in the spool is prevented from rotating with respect to the spool shaft. Additionally, a pair of ball bearings is attached to the tubular member. Accordingly, the spool is capable of smoothly rotating when the drag force is applied to the spool. However, the spool needs the tubular member and the pair of ball bearings. Accordingly, the spool structure will be complicated. Furthermore, a ball bearing is generally an expensive part. Therefore, manufacturing cost of the spool will be increased with the pair of ball bearings.

SUMMARY OF THE INVENTION

Accordingly, aspects of the present invention have been created to solve the above-mentioned problems occurring in the conventional practice, and to produce a spool for a spinning reel to prevent wobbling from easily occurring between the spool shaft and the spool unit without increasing the cost of the spool.

According to one aspect of the present invention, the spool for a spinning reel is attached to a non-circular portion formed on a tip of a spool shaft. The spool shaft is allowed to move back and forth but prevented from rotating with respect to a reel unit. The spool includes a spool unit and a tubular bearing member. The spool unit includes a bobbin trunk and a drag accommodation part. The bobbin trunk is capable of winding a fishing line around its outer periphery. The drag accommodation part is formed on the inner peripheral side of the bobbin trunk. The drag accommodation part is capable of accommodating a drag washer. The tubular member rotatably supports the spool unit. The bearing member is made of synthetic resin. The bearing member is arranged on the inner peripheral side of the bobbin trunk. The bearing member has an engagement hole, and the engagement hole is non-rotatably engaged with the non-circular portion of the spool shaft.

When the spool is attached to the spool shaft, the engagement hole of the bearing member arranged on the inner peripheral surface of the bobbin trunk is engaged with the non-circular part of the spool shaft. With the configuration, the synthetic-resin bearing member is prevented from rotating with respect to the spool shaft. Additionally, the spool unit and the bearing member are capable of rotating between the outer peripheral surface of the bearing member and the inner peripheral surface of the bobbin trunk. Accordingly, the spool unit is capable of smoothly rotating with respect to the spool shaft even when the drag force is applied to the spool while the bobbin trunk is supported by the circular outer peripheral surface of the bearing member. According to the spool, the engagement hole of the synthetic-resin tubular bearing member is engaged with the non-circular portion of the spool shaft. Therefore, it is possible to accurately prevent the bearing member from rotating with a simple structure. Furthermore, it is possible to prevent wobble from easily occurring between the spool shaft and the bearing member without cost increase of the spool.

According to another aspect of the present invention, the non-circular portion includes a groove on its outer periphery. The groove is arranged in the circumferential direction of the non-circular portion. The groove is dented compared to the other part of the non-circular portion. Additionally, the bearing member includes a retaining protrusion. The retaining protrusion is configured to be interlocked with the groove. The retaining protrusion is formed in the engagement hole. The retaining protrusion protrudes radially inward. The retaining protrusion formed in the bearing member is interlocked with the groove formed on the spool shaft. Therefore, even when the spool is removed from the spool shaft, the bearing member remains to be attached to the spool shaft. Accordingly, it is possible to prevent the bearing member from being detached and dropping from the spool unit.

According to a further aspect of the present invention, the cross-sectional shape of the engagement hole includes two circular-arc portions and two straight lines. The circular-arc portions are concentrically opposed to each other. The two straight lines are arranged in parallel to each other. The two straight lines connect both ends of the circular-arc portions. The engagement hole to be engaged with the non-circular portion of the spool shaft includes the cross-section comprised of a pair of circular-arc portions and a pair of straight lines. Accordingly, it is easy to form the non-circular portion and the engagement hole.

According to still a further aspect of the present invention, the retaining protrusion protrudes toward the axis of the spool shaft from at least a part of one of the circular-arc portions. The retaining protrusion is formed on at least a part of one of the pair of circular-arc portions. Accordingly, it is easy to remove the bearing member from the spool shaft when it is necessary to remove the bearing member from the spool shaft for removing the rotor from the spool shaft. More specifically, when the bearing member is pulled toward the tip of the spool shaft, the retaining protrusion bends by means of elasticity of synthetic resin and is accordingly disengaged from the groove. Thus it is easy to remove the bearing member from the spool shaft. Especially, when the retaining protrusion is formed on a part of the circular-arc portions, the retaining protrusion more easily bends. Accordingly, it is easier to remove the bearing member from the spool shaft.

According to yet another aspect of the present invention, in the spool, the retaining protrusion is formed on the inner peripheral part of one end of the engagement hole. In this case, it is easy to form the retaining protrusion because the retaining protrusion is formed on one end of the bearing member.

These and other features, aspects and advantages of the present invention will become apparent to those skilled in the art from the following detailed description, which, taken in conjunction with the annexed drawings, disclosed in preferred example embodiments of the present invention.

BRIEF DESCRIPTION OF THE DRAWINGS

Referring now to the attached drawings which form a part of this original disclosure.

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
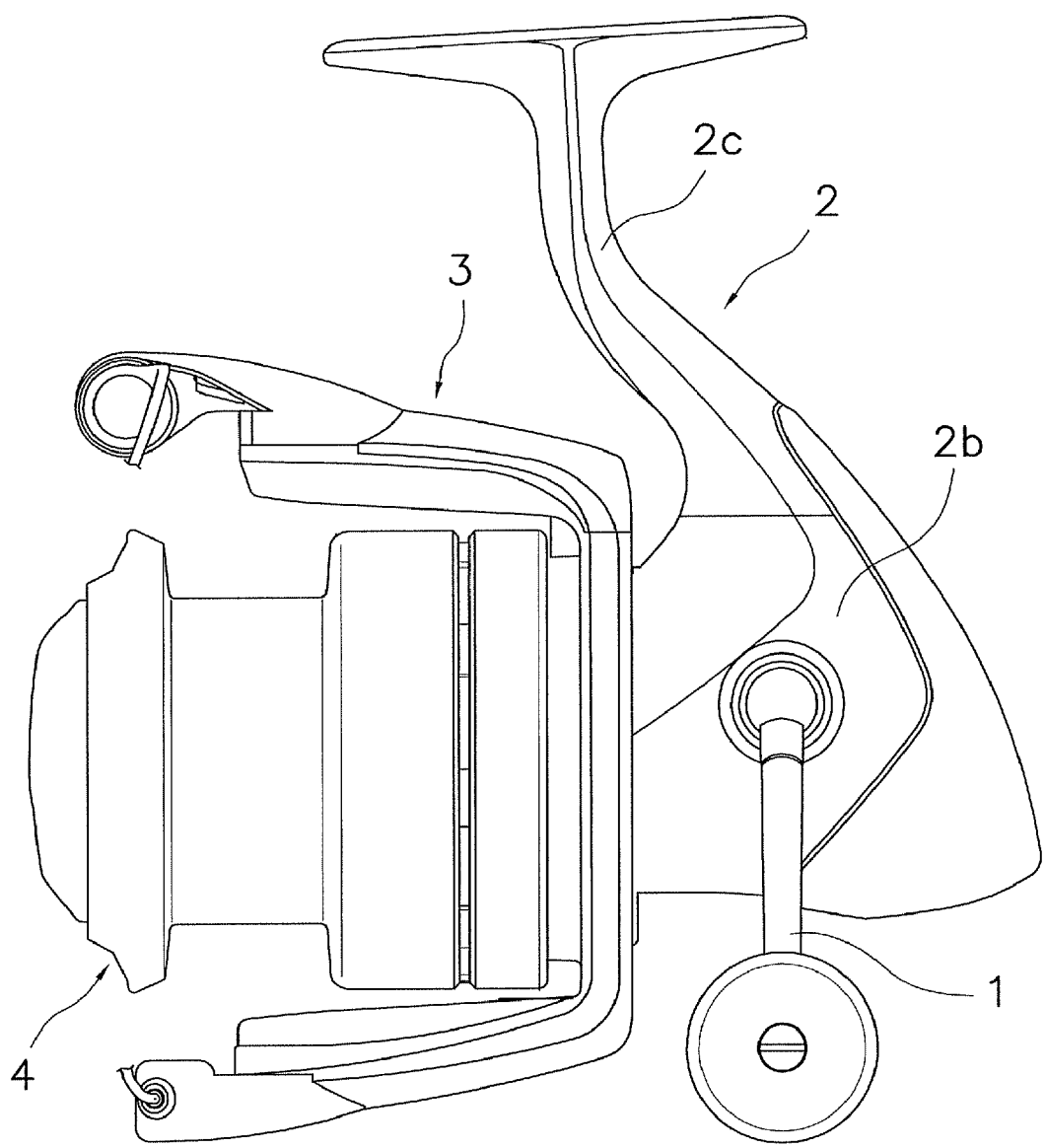
FIG. 1 is a lateral view of a spinning reel of an embodiment of the present invention.
Figure 2:
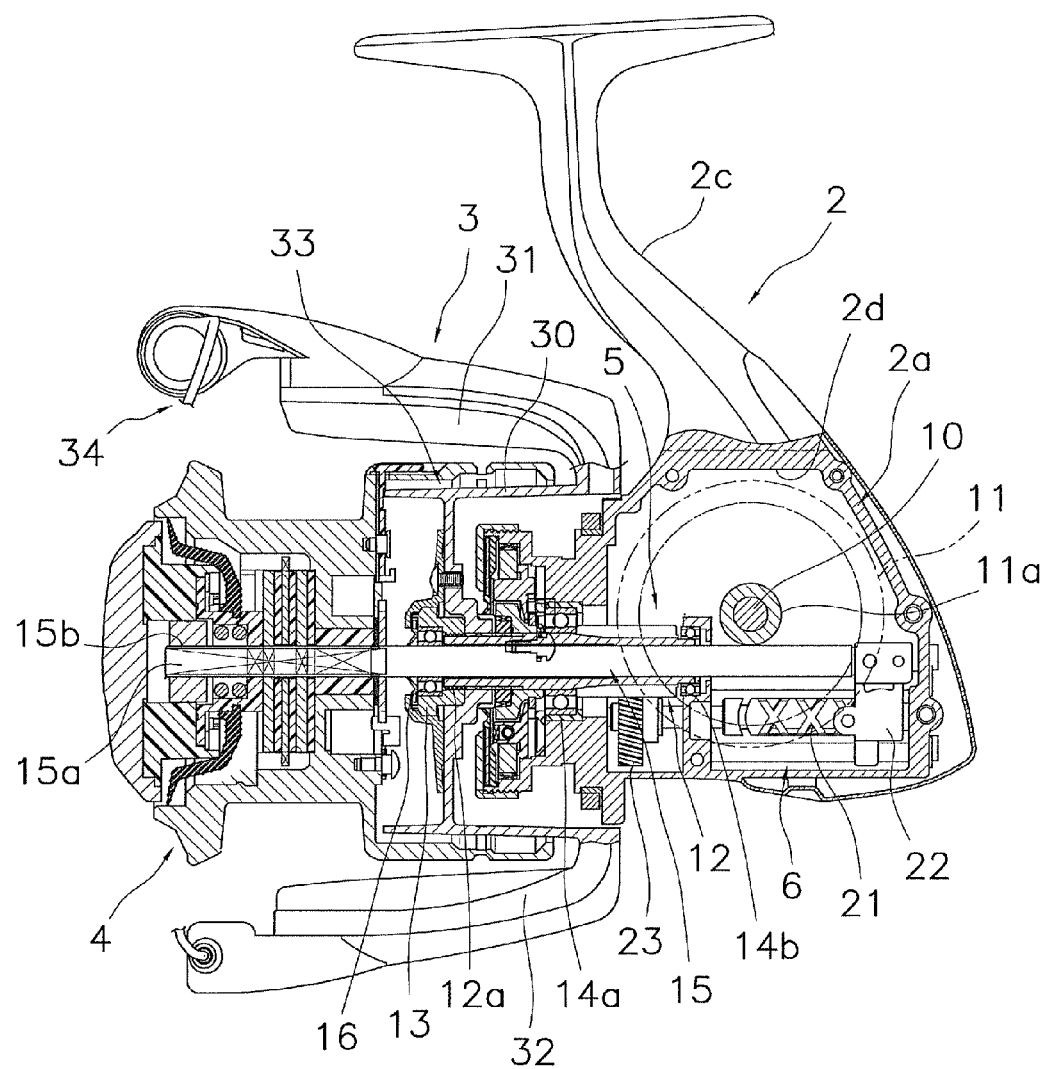
FIG. 2 is a vertical cross-sectional view of the spinning reel illustrated in FIG. 1.

Referring initially to FIGS. 1 and 2, a spinning reel of an embodiment of the present invention includes a reel unit 2, a rotor 3, and a spool 4. The reel unit 2 rotatably supports a handle assembly 1. The rotor 3 is configured to wind a fishing line around the spool 4. The rotor 3 is rotatably supported at the front part of the reel unit 2. The spool 4 is configured to wind a fishing line around its outer periphery. The spool 4 is arranged in front of the rotor 3 for moving back and forth. The handle assembly 1 may be attached to either the left side (see FIG. 1) or the right side of the reel unit 2.

As illustrated in FIGS. 1 and 2, the reel unit 2 includes a reel body 2a, a lid member 2b, and a rod attachment leg 2c. The reel body 2a includes an opening 2d. For example, the reel body 2a is made of aluminum alloy or synthetic resin. The lid member 2b is attached to the reel body 2a for covering the opening 2d. The lid member 2b is configured to be detached and re-attached to the reel body 2a. For example, the lid member 2b is made of aluminum alloy or synthetic resin. The rod attachment leg 2c extends forward from the reel body 2a in an obliquely upward direction.

As illustrated in FIG. 2, the reel body 2a has an inner space. The inner space accommodates a rotor driving mechanism 5 and an oscillation mechanism 6. The rotor driving mechanism 5 rotates the rotor 3 in conjunction with the rotation of the handle assembly 1. The oscillation mechanism 6 moves the spool 4 back and forth for uniformly winding the fishing line around the spool 4.

As illustrated in FIG. 2, the rotor driving mechanism 5 includes a main gear 11 and a pinion gear 12. The main gear 11 rotates along with a main gear shaft 11a. A handle shaft 10 of the handle assembly 1 is fixed to the main gear shaft 11a. The pinion gear 12 meshes with the main gear 11. The pinion gear 12 is formed in a tubular shape. The pinion gear 12 includes a front portion 12a. The front portion 12a penetrates the center of the rotor 3, and is fixed to the rotor 3 by means of a nut 13. Axially intermediate and rear portions of the pinion gear 12 are rotatably supported by the reel body 2a through a pair of bearings 14a and 14b. The bearings 14a and 14b are attached to the reel body 2a through a predetermined space.

The spool 4 is coupled to the tip of a spool shaft 15 through a drag mechanism 60. The oscillation mechanism 6 is configured to move the spool shaft 15 back and forth for moving the spool 4 in the same direction as the spool shaft 15. The oscillation mechanism 6 includes a spiral shaft 21, a slider 22, and an intermediate gear 23. The spiral shaft 21 is arranged below and in parallel to the spool shaft 15. The slider 22 is configured to move back and forth along the spiral shaft 21. The intermediate gear 23 is secured to the tip of the spiral shaft 21. The rear end of the spool shaft 15 is non-rotatably secured to the slider 22. The intermediate gear 23 meshes with the pinion gear 12.

The spool shaft 15 penetrates the center of the pinion gear 12. The oscillation mechanism 6 reciprocates the spool shaft 15 back and forth in the interior of the pinion gear 12. The intermediate portion of the spool shaft 15 is supported by a bearing 16 while the rear portion of the spool shaft 15 is supported by the inner peripheral surface of the rear portion of the pinion gear 12. Thus, the spool shaft 15 is capable of rotating and moving in the axial direction. The bearing 16 is attached to the interior of the nut 13. Electroless nickel (Ni) plating is applied to the surface of the spool shaft 15 for preventing the spool shaft 15 from biting into the pinion gear 12 when the spool shaft 15 moves back and forth while relatively rotating with the pinion gear 12.

Figure 4:
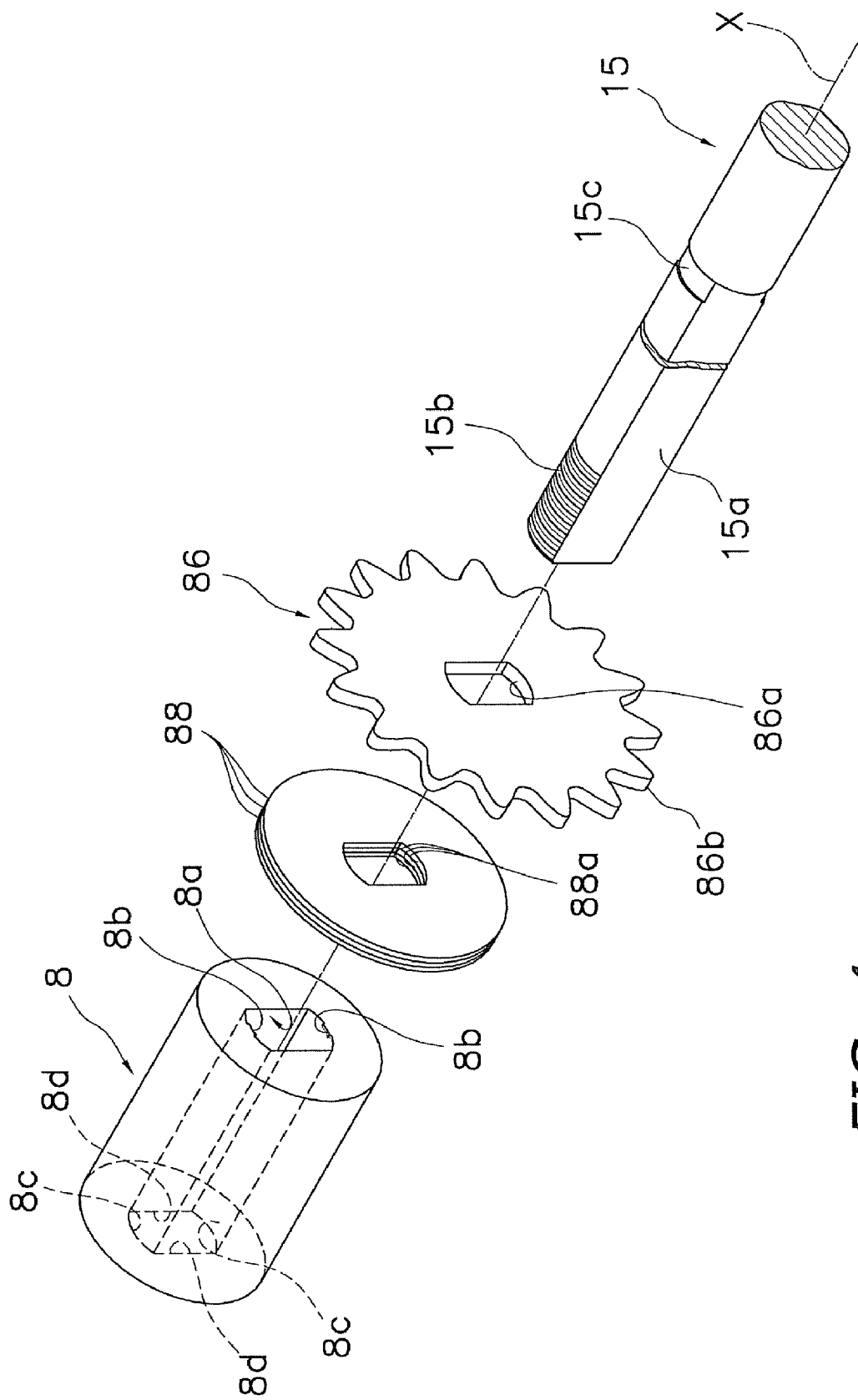
FIG. 4 is an exploded perspective view for illustrating relations among a bearing member, its surrounding members, and a spool shaft.

As illustrated in FIG. 4, a non-circular section 15a and male threaded portions 15b are formed on the tip (i.e., front end) of the spool shaft 15. The non-circular portion 15a has parallel sides, and prevents rotation of the spool shaft 15 when the spool shaft 15 is inserted into a bearing member 8 (to be discussed later). The male threaded portions 15b regulate the drag force. The non-circular portion 15a has an substantially oblong cross section. The cross section is made up of a pair of opposed circular-arc portions and a pair of parallel straight lines. Additionally, a groove 15c is circumferentially formed on the base end of the non-circular portion 15a. Thus the groove 15c is dented from the other part of the spool shaft 15.

As obviously illustrated in FIG. 4, seen from the cross-section of the non-circular portion 15a, diameter of the opposed circular portions of the groove 15c is slightly smaller than that of the other circular portions of the non-circular portion 15a. However, the width of the opposed parallel straight lines of the circular portion 15c is the same as the other straight lines of the non-circular portion 15a. A sound generation member 86 is attached to the spool shaft 15. The sound generation member 86 forms a part of an after-mentioned drag sound generation mechanism 85. Three adjustment washers 88 are attached to the front side of the sound generation member 86 for adjusting a position of the spool 4 in a spool shaft direction.

The sound generation member 86 is made of metal. The sound generation member 86 includes am engagement hole 86a. The engagement hole 86a is engaged with the non-circular portion 15a. The engagement hole 86a is formed in a slot shape. The sound generation member 86 also has a function of generating the drag force by regulating backward movement of the spool 4. The adjustment washers 88 are made of synthetic resin with elasticity. Each of the adjustment washers 88 includes an engagement hole 88a. The engagement hole 88a is engaged with the groove 15c. The engagement hole 88a is formed in a slot shape. Accordingly, the adjustment washers 88 are not easily detached from the groove 15c.

As illustrated in FIG. 2, the rotor 3 includes a tubular coupling part 30, a rotor body 33, and a bail arm 34. The rotor body 33 includes a first rotor arm 31 and a second rotor arm 32. The first and second rotor arms 31 and 32 are arranged lateral to the coupling part 30. The first and second rotor arms 31 and 32 are opposed to each other. The bail arm 34 is attached to the rotor body 33. The bail arm 34 is configured to be flipped between a line-winding position and a line-releasing position. For example, the rotor body 33 is made of aluminum alloy or synthetic resin. The coupling part 30 and the first and second rotor arms 31 and 32 are integrally formed as the rotor body 33.

Spool Structure

Figure 3:
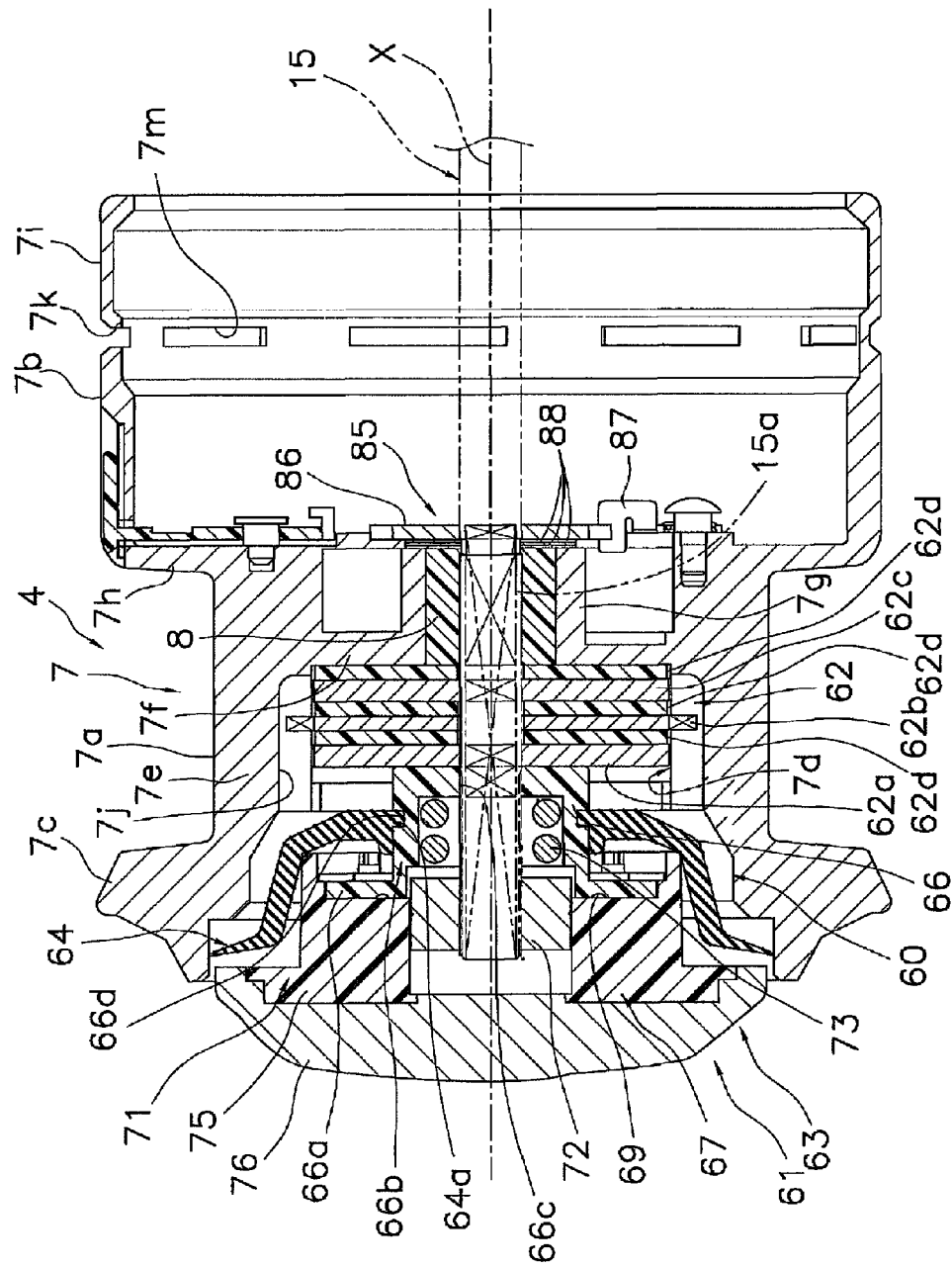
FIG. 3 is a enlarged cross-sectional view of a spool.

As illustrated in FIG. 2, the spool 4 is arranged between the first rotor arm 31 and the second rotor arm 32 of the rotor 3. The spool 4 is attached to the non-circular portion 15a formed on the tip of the spool shaft 15 through the drag mechanism 60. As illustrated in FIG. 3, the spool 4 includes a spool unit 7 and a bearing member 8. The bearing member 8 is attached to the spool unit 7.

The spool unit 7 includes a bobbin trunk 7a, a skirt portion 7b, a front flange portion 7c, and a drag accommodation portion 7d. The bobbin trunk 7a is provided for winding a fishing line around its outer periphery. For example, the bobbin trunk 7a is made of aluminum alloy. The skirt portion 7b is integrally formed with the bobbin trunk 7a, and extends from the rear end of the bobbin trunk 7a. The front flange portion 7c is integrally formed with the bobbin trunk 7a, and extends from the front end of the bobbin trunk 7a. The drag accommodation portion 7d is formed on the inner peripheral side of the bobbin trunk 7a. The drag mechanism 60 is attached to the drag accommodation portion 7.

The bobbin trunk 7a is a cylindrical member. The outer peripheral surface of the bobbin trunk 7a is parallel to the spool shaft 15. The bobbin trunk 7a includes a tubular portion 7e, a disk-shaped support wall 7f, and a tubular shaft support portion 7g. A fishing line is wound around the tubular portion 7e. The support wall 7f is integrally formed with the inner peripheral surface of the tubular portion 7e. The shaft support portion 7g is formed on the inner peripheral side of the support wall 7f. The bearing member 8 is rotatably attached to the inner peripheral surface of the shaft support portion 7g.

The skirt portion 7b includes a rear flange portion 7h and a cylindrical portion 7i. The rear flange portion 7h radially extends from the back of the bobbin trunk 7a. The cylindrical portion 7i is formed in a tubular shape and extends backward from the outer periphery of the rear flange portion 7h. The coupling part 30 of the rotor 3 is arranged on the inner side of the cylindrical portion 7i. The cylindrical portion 7i has a chamfered annular groove 7k and a plurality of slits 7m. The slits 7m are formed within the annular groove 7k, and are arranged at predetermined intervals in the circumferential direction of the annular groove 7k.

In the present embodiment, the front flange portion 7c is integrally formed with the bobbin trunk 7a. However, the front flange portion 7c may be separated from the bobbin trunk 7a. In this case, the front flange portion 7c may be bolted to the bobbin trunk 7a or may be fixed to the bobbin trunk 7a by means of a flange fixation member for fixing the front flange portion 7c to the bobbin trunk 7a.

The drag accommodation portion 7d is formed in the interior of the bobbin trunk 7a. More specifically, the drag accommodation portion 7d is formed in front of the support wall 7f. The drag accommodation portion 7d is circularly dented. The drag accommodation portion 7d may be separated from the bobbin trunk 7a.

The drag accommodation portion 7d accommodates an after-mentioned friction part 62 of the drag mechanism 60 in its interior. The drag accommodation portion 7d has a plurality of (e.g., two) interlocking grooves 7j on its inner peripheral surface. The interlocking grooves 7j are arranged at predetermined intervals in the circumferential direction of the drag accommodation portion 7d. Each of the interlocking grooves 7j has a non-circular (e.g., rectangular) cross section.

Figure 5:
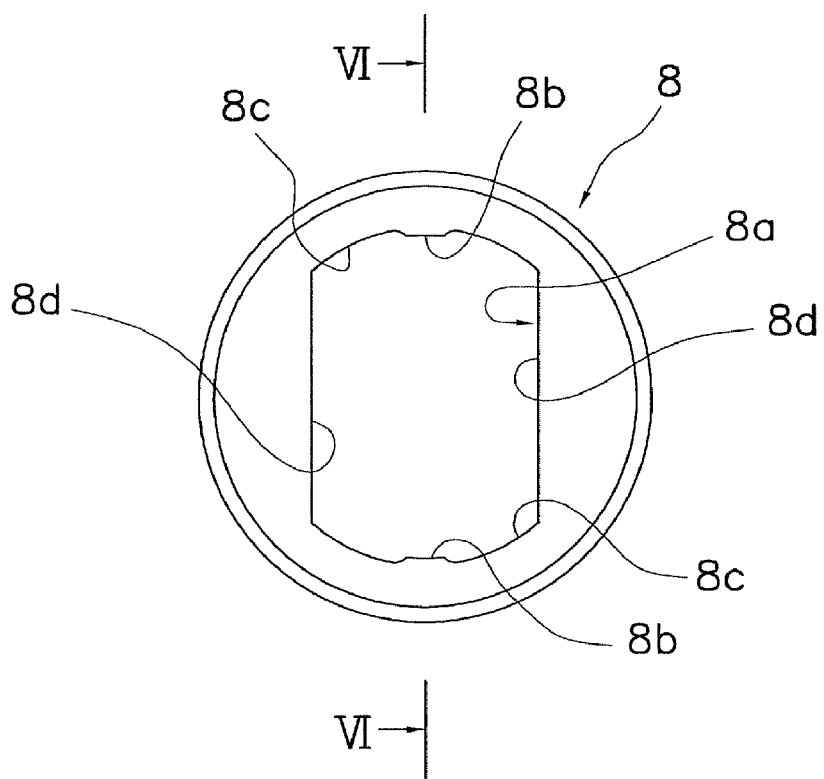
FIG. 5 is a back view of the bearing member.
Figure 6:
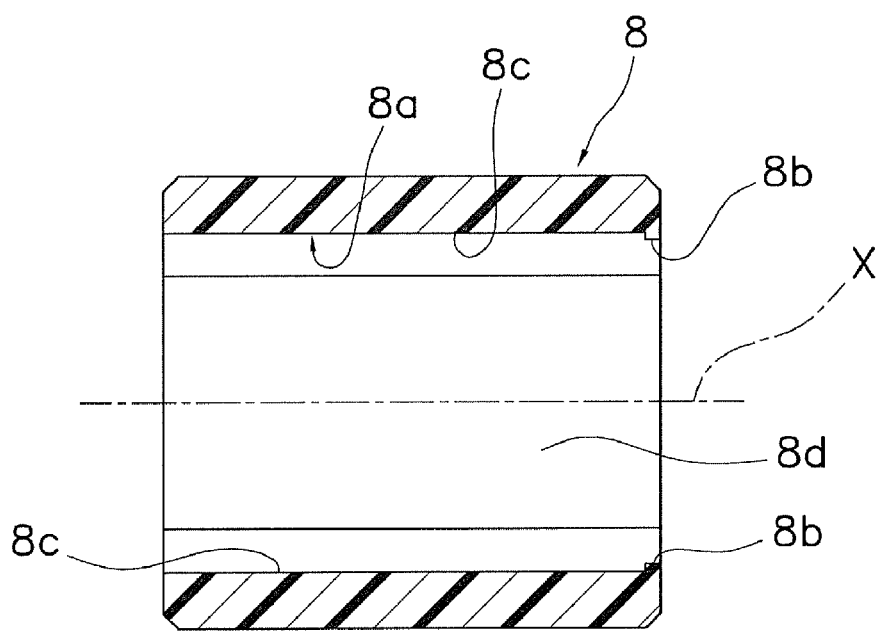
FIG. 6 is a cross-sectional view of a VI-VI section of the bearing member illustrated in FIG. 5.

As illustrated in FIGS. 4 to 6, the bearing member 8 is formed in a tubular shape. The bearing member 8 is made of synthetic resin with high tribological property, high-hardness, and elasticity (e.g., polyacetal resin). Accordingly, the bearing member 8 functions as a sliding bearing. The bearing member 8 includes an engagement hole 8a. The engagement hole 8a includes a substantially oblong shape. The engagement hole 8a is non-rotatably engaged with the non-circular portion 15a of the spool shaft 15. Axial length of the bearing member 8 is substantially the same as that of the shaft support portion 7g of the bobbin trunk 7a. The bearing member 8 is arranged on the inner peripheral side of the shaft support portion 7g. The bearing member 8 rotatably supports the spool unit 7. The cross-sectional shape of the engagement hole 8a is approximately the same as that of the non-circular portion 15a. The cross section of the engagement hole 8a is made of two opposed circular-arc portions 8c and two straight lines 8d. The circular portions 8c are concentrically arranged. The lines 8d connect both ends of the circular portions 8c. Furthermore, the bearing member 8 includes retaining protrusions 8b. The retaining protrusions 8b are formed in the engagement hole 8a and protrude inwardly in the radial direction. The retaining protrusions 8b are configured to be interlocked with the grooves 15c. More specifically, the retaining protrusions 8b are formed on the rear end of the engagement hole 8a (i.e., at the center part of the circular-arc portions 8c) and are perpendicular to and extend towards an axis X of the spool shaft 15.

When the spool 4 is attached to the spool shaft 15, the engagement hole 8a of the bearing member 8, which is arranged on the inner peripheral surface of the bobbin trunk 7a, is engaged with substantially the entire outer peripheral surface of the non-circular portion 15a. As a result, the synthetic resin bearing member 8 is prevented from rotating with respect to the spool shaft 15. Simultaneously, however, the spool unit 7 and the bearing member 8 are capable of rotating between the outer peripheral surface of the bearing member 8 and the inner peripheral surface of the bobbin trunk 7a. Consequently, even when the drag force is applied to the spool 4 while the bobbin trunk 7a is supported by the circular-shaped outer peripheral surface of the bearing member 8, the spool unit 7 rotates smoothly with respect to the spool shaft 15.

According to the present embodiment, the engagement hole 8a of the bearing member 8 is engaged with the non-circular portion 15a of the spool shaft 15. Therefore, it is possible to accurately prevent the bearing member 8 from rotating with a simple structure. Furthermore, it is possible to prevent wobbling from occurring between the spool shaft 15 and the bearing member 8 without increasing the cost of the spool.

Drag Structure

As illustrated in FIG. 3, the drag mechanism 60 applies the drag force to the spool 4 by braking rotation of the spool 4 in the line-releasing direction. The drag mechanism 60 includes a drag knob assembly 61, the friction part 62, and the drag sound generation mechanism 85. The drag knob assembly 61 is manually operated by an angler for regulating the drag force. The friction part 62 includes three drag washers 62a to 62c. The drag washers 62a to 62c are pressed toward the spool 4 by the drag knob assembly 61, and the drag force is regulated accordingly. The drag sound generation mechanism 85 is configured to generate sounds when the drag force is applied to the spool 4.

The drag knob assembly 61 includes a knob part 63, a sealing member 64, and a knob sound generation mechanism (not illustrated in the figure). The knob part 63 includes a first member 66 and a second member 67. The second member 67 is capable of relatively rotating with the first member 66. The sealing member 64 seals a gap between the knob part 63 and the spool 4 and a gap between the first member 66 and the second member 67. The knob sound generation mechanism is configured to generate sounds by the relative rotation of the first member 66 and the second member 67.

The first member 66 is a tubular member with a brim and made of synthetic resin. The first member 66 includes a ring-shaped brim portion 66a and a cylindrical portion 66b. Diameter of the cylindrical portion 66b is smaller than that of the brim portion 66a. The first member 66 is attached to the spool shaft 15. The first member 66 is prevented from rotating but is allowed to move in the axial direction. A single or plurality of sound generation recesses 69 are formed on the front end surface of the brim portion 66a. The sound generation recesses 69 make up a part of the knob sound generation mechanism.

An oblong shaped interlocking slot 66c is formed in the inner periphery of the cylindrical portion 66b. The interlocking slot 66c is non-rotatably engaged with the non-circular portion 15a of the spool shaft 15. An annular groove 66d is formed on the outer peripheral surface of the cylindrical portion 66b. The annular groove 66d is arranged to match with the rear part (i.e., an after-mentioned annular protrusion 64a) of the attachment portion of the sealing member 64. Thus, the annular protrusion 64a is interlocked with the annular groove 66d. The rear end surface of the cylindrical portion 66b abuts on the drag washer 62a of the friction part 62.

The second member 67 is opposed to the first member 66. The second member 67 is capable of rotating with the first member 66. The second member 67 is screwed onto the spool shaft 15. The second member 67 is formed in a tubular shape and extends toward the first member 66 to cover the brim portion 66a. The second member 67 includes a knob member 71, a nut member 72, and a spring member 73. The nut member 72 is attached to the knob member 71. The nut member 72 is prevented from rotating but is allowed to move in the axial direction. The nut member 72 is screwed onto the spool shaft 15. The spring member 73 is a spring coil. The spring member 73 is arranged between the nut member 72 and the first member 66 while being compressed.

The knob member 71 includes a knob body 75 and an operation knob 76. The knob body 75 has a tubular shape and made of synthetic resin. The operation knob 76 is fixed to the front surface of the knob body 75 along the radial direction. The operation knob 76 is made of metal.

The nut member 72 is screwed onto the male threaded portions 15b formed on the outer peripheral surface of the tip of the spool shaft 15. The nut member 72 is configured to compress the spring member 73 in conjunction with rotation of the knob body 75. For example, the nut member 72 is a hexagonal nut.

The sealing member 64 is a disk-shaped member made of synthetic rubber. The sealing member 64 is arranged between the inner peripheral surface of the front flange portion 7c of the spool 4 and the outer peripheral surface of the cylindrical portion 66b of the first member 66. The sealing member 64 includes an annular protrusion 64a on its inner peripheral surface. The annular protrusion 64a is interlocked with the annular groove 66d. Additionally, the annular member 64 makes contact with the attachment surface of the cylindrical portion 66b and the rear end surface of the knob body 75. Furthermore, the annular portion 64a extends outward in the radial direction and makes contact with the inner peripheral surface of the front flange portion 7c. The cross section of the annular protrusion 64a is formed in an S-shape. Accordingly, the sealing member 64 simultaneously seals a gap between the spool 4 and the drag knob assembly 61 and a gap between the first member 66 and the second member 67.

As described above, the friction part 62 is attached to the drag accommodation portion 7d. The drag washer 62a is a disk member made of metal. As illustrated in FIG. 3, the drag washer 62a makes contact with the first member 66 and is engaged with the non-circular portion 15c of the spool shaft 15. The drag washer 62a is prevented from rotating with respect to the spool shaft 15. The drag washer 62b is a disk member made of metal and is engaged with the interlocking groove 7j formed on the drag accommodation portion 7d of the spool 4. Thus the drag washer 62b is capable of rotating integrally with the spool 4. The drag washer 62c is a disk member made of metal. Just like the drag washer 62a, the drag washer 62c is also prevented from rotating with respect to the spool shaft 15. Drag disks 62d are arranged among the drag washers 62a to 62c and between the drag washer 62c and the drag accommodation portion 7d. The drag disks 62d are capable of rotating with respect to the spool 4 and the spool shaft 15. The drag disks 62d are disk members made of felt or graphite.

The drag sound generation mechanism 85 is configured to a generate sound when the spool 4 rotates relative to the spool shaft 15 during application of the drag force. As illustrated in FIG. 2, the drag sound generation mechanism 85 includes the disk-shaped sound generation member 86 and a tab member 87. The sound generation member 86 is attached to the rear end of the non-circular portion 15a of the spool shaft 15. The tab member 87 is pivotally attached to the rear end surface of the bobbin trunk 7a and configured to repeatedly hit the sound generation member 86. As illustrated in FIG. 3, the sound generation member 86 is a disk member and is non-rotatably attached to the non-circular portion 15a while its backward movement is regulated. The sound generation member 86 includes a rim portion on its outer periphery. The rim portion has an undulating surface 86b. The undulating surface 86b includes a plurality of protruding surfaces and recessed surfaces. The protruding and recessed surfaces are arranged at predetermined intervals in the circumferential direction of the sound generation member 86. When the spool 4 rotates while the drag force is applied to it, the tab member 87 repeatedly hits the plurality of protruding and recessed surfaces of the undulating surface 86b, thereby generating a sound.

Operation and Action of Reel

Before fishing, an angler regulates the drag force in accordance with the size and kind of a target fish. The angler rotates the drag knob assembly 61 for regulating the drag force. For example, when the angler rotates the drag knob assembly 61 in the clockwise direction, the first member 66 is pressed toward the friction part 62 through the spring member 73 by means of the nut member 72 screwed onto the spool shaft 15. The drag force is then increased.

In surf-casting, the angler flips the bail arm 34 to the line-releasing position. In this condition, the angler casts the fishing rod while hocking the fishing line with his/her index finger of the hand holding the fishing rod Then, the fishing line is swiftly released by means of the weight of a tackle. When the handle assembly 1 is rotated in the line-winding direction on this condition, the rotor 3 is rotated in the line-winding direction by means of the rotor driving mechanism 5. Additionally, the bail arm 34 is returned to the line-winding position by means of a bail flipping mechanism (not illustrated in the figure). Then, the fishing line is wound around the spool 4 via the bail arm 34.

During fishing when a large fish bites, the strong force exceeding the preliminary-set drag force may be applied to the fishing line. In this case, the drag force is applied to the spool 4 and, accordingly, the spool 4 rotates in the line-releasing direction. Additionally, the spool unit 7 is supported by the synthetic-resin bearing member 8 that has the engagement hole 8a which is non-rotatably engaged with the non-circular portion 15a of the spool shaft 15. Therefore, it is possible to accurately prevent the bearing member 8 from rotating with a simple structure. Furthermore, it is possible to prevent wobbling from occurring between the spool shaft 15 and the bearing member 8 while an increase in the cost of the spool prevented.

Additionally, the retaining protrusions 8b formed in the bearing member 8 are interlocked with the groove 15c formed on the spool shaft 15. Therefore, even when the spool 4 is removed from the spool shaft 15, the bearing member 8 remains attached to the spool shaft 15. Accordingly, it is possible to prevent the bearing member 8 from being detached and dropping from the spool unit 7.

Furthermore, the engagement hole 8a, which is engaged with the non-circular portion 15a of the pool shaft 15, is made up of a pair of circular-arc portions and a pair of straight lines. Therefore, it is easy to form the non-circular portion 15a and the engagement hole 8a.

Also, when it is necessary to remove the bearing member 8 for removing the rotor 3, it is easy to remove the bearing member 8 from the spool shaft 15. This is because each retaining protrusion 8b is formed on at least a part of the circular-arc portion 8c. In other words, when the bearing member 8 is pulled toward the tip of the spool shaft 15, the retaining protrusions 8b bend by means of elasticity of synthetic resin and are accordingly detached from the groove 15c. Thus, it is easy to remove the bearing member 8 from the spool shaft 15. Especially, according to the present embodiment, each retaining protrusion 8b is formed on a part of the circular-arc portion 8c. Therefore, the retaining protrusion 8b tends to easily bend, and it is easier to remove the bearing member 8 from the spool shaft 15.

Also, each retaining protrusion 8b is formed on the inner periphery of one end of the engagement hole 8a. Therefore, it is easy to form the retaining protrusion 8b.

OTHER EXAMPLE EMBODIMENTS

Example (a)

Figure 7:
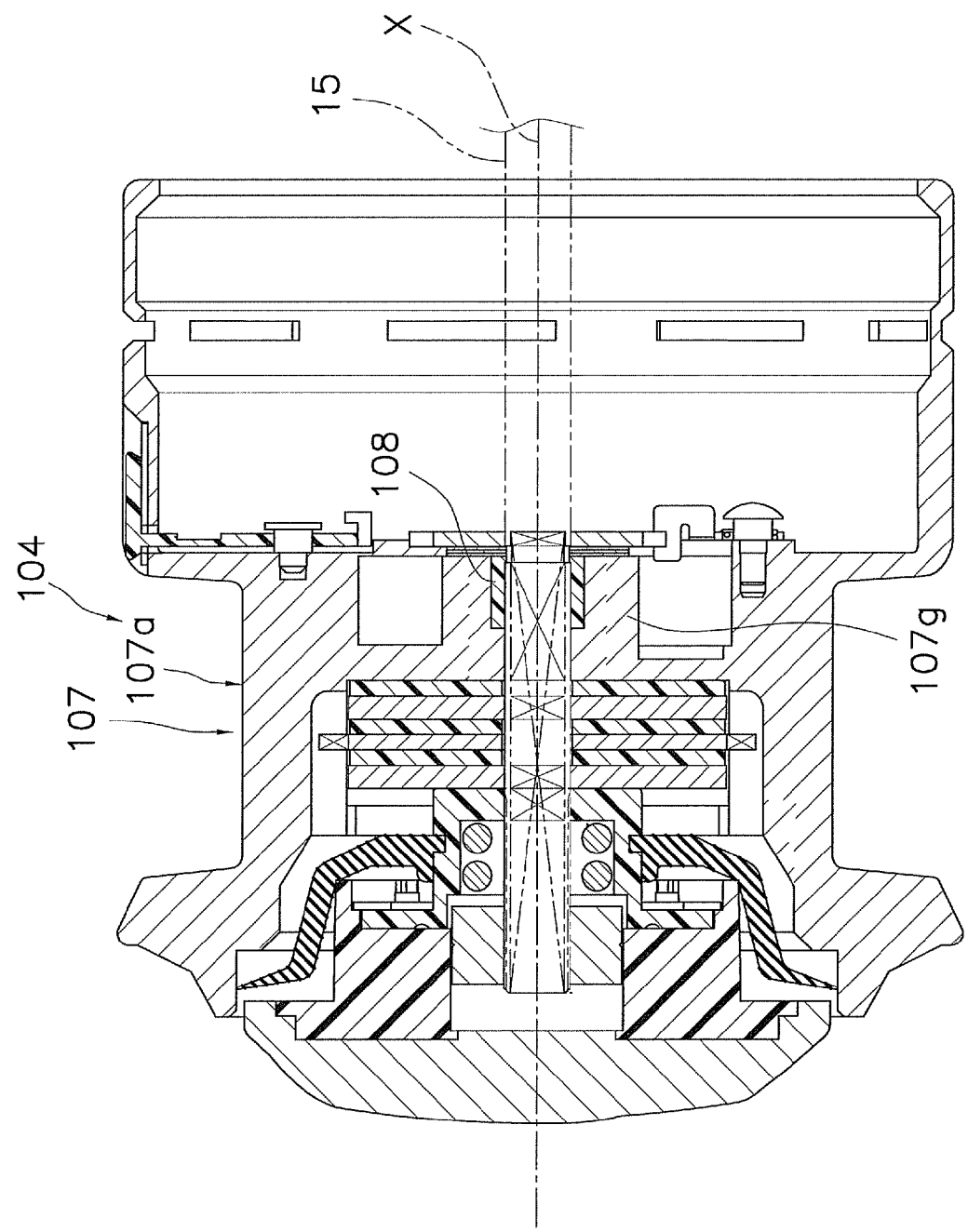
FIG. 7 is an enlarged cross-sectional view of a spool of another embodiment.

In the above-mentioned embodiment, axial length of the bearing member 8 is set to be the same as that of the shaft support portion 7g. However, the present invention is not limited to the configuration. For example, as illustrated in FIG. 7, a spool 104 includes a bearing member 108, and axial length of the bearing member 108 is slightly longer than half the axial length of a shaft support portion 107g of a bobbin trunk 107a of a spool unit 107. Diameter of the inner peripheral surface of the shaft support portion 107g is slightly larger (e.g., 0.1 to 2 mm) than the outer diameter of the spool shaft 15. Thus, the shaft support portion 107g does not make contact with the non-circular portion 15a. Detailed illustration of this will be omitted in FIG. 7. Also, other elements of the spool 104 of the example (a) are the same as the above-mentioned embodiment. Therefore, explanation and symbols/numbers corresponding to the elements will be hereinafter omitted.

According to the example (a), it is possible to realize the same working effect as the above-mentioned embodiment.

Example (b)

Figure 8:
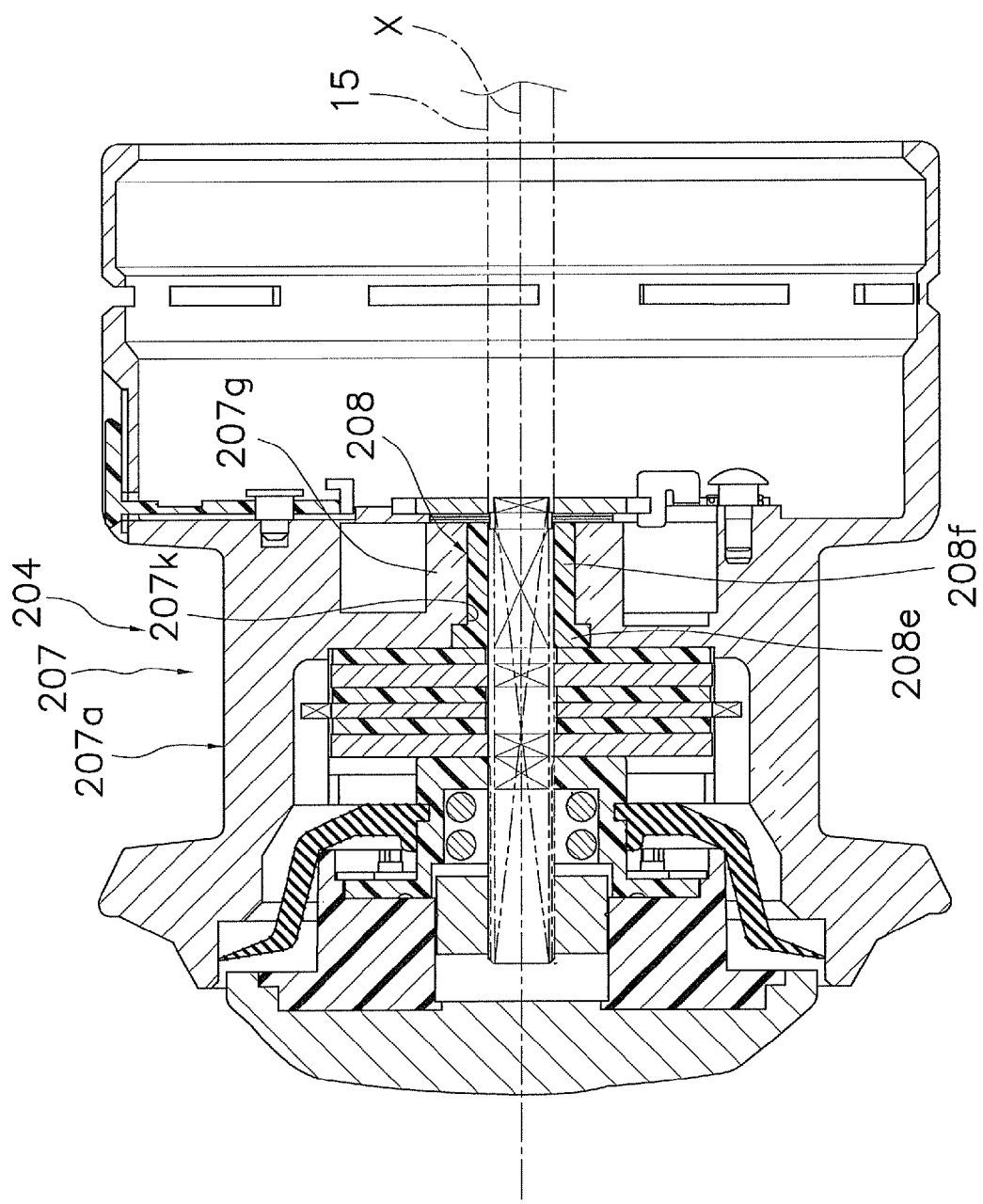
FIG. 8 is an enlarged cross-sectional view of a spool of yet another embodiment.

In the above-mentioned embodiment, the bearing member 8 is formed in a tubular shape. However, the present invention is not limited to the configuration. For example, as illustrated in FIG. 8, a stepped attachment hole 207k is formed in a shaft support portion 207g of a bobbin trunk 207a forming a spool unit 207 in a spool 204. Additionally, a bearing member 208 is formed in a cylindrical shape with a brim. The bearing member 208 includes a large-diameter brim 208e and a tubular portion 208f. In this case, when the spool 204 is removed from the spool shaft 15, both the spool unit 207 and the bearing member 208 are removed together from the spool shaft 15 by means of the brim portion 208e.

Accordingly, any retaining protrusions are not formed in the configuration of the example (b). Other elements of the spool 204 are the same as the above-mentioned embodiment. Therefore, explanation and symbols/numbers corresponding to the elements will be hereinafter omitted.

According to the example (b), it is possible to realize the same working effect as the above-mentioned embodiment.

Example (c)

In the above-mentioned embodiment, the spool shaft 15 includes the non-circular portion 15a. The cross-section of the non-circular portion 15a is formed in a substantially oblong shape and includes a pair of circular-arc portions and a pair of straight lines. Additionally, the engagement hole 8a of the bearing member 8 is engaged with the non-circular portion 15c, and is formed in the same shape as the cross-section of the non-circular portion 15c. However, the cross-sectional shapes of the non-circular portion and the engagement hole are not limited to the configuration. For example, the cross-sectional shape of the non-circular portion may be a polygonal shape (e.g., rectangular) or an oblong shape.

GENERAL INTERPRETATION

A used herein, the following directional terms "forward, rearward, above, downward, vertical, horizontal, below and transverse" as well as any other similar directional terms refer to those directions of a device equipped with the present invention. Accordingly, these terms, as utilized to describe aspects of the present invention, should be interpreted relative to a device equipped with the present invention.

The term "configured" as used herein to describe a component, section or part of a device includes hardware that is constructed to carry out the desired function.

Terms that are expressed as "means-plus function" in the claims should include any structure that can be utilized to carry out the function of that part of the present invention.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," and their derivatives. Also, the term "part," "section," "portion," "member," or "element" when used in the singular can have the dual meaning of a single part or a plurality of parts.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spool for a spinning reel where the spool is attached to a non-circular portion formed on a tip of a spool shaft, the spool shaft being allowed to move back and forth but prevented from rotating with respect to a reel unit, the spool comprising:
   a spool unit including a bobbin trunk with an outer peripheral surface to wind a fishing line around, a drag accommodation space to accommodate a drag washer, and a tubular shaft support member integrally formed with the bobbin trunk as a one-piece, unitary member, the drag accommodation space and the shaft support member being located on an inner side of the bobbin trunk and extending along the axial direction of the spool; and
   a tubular bearing member including an engagement hole non-rotatably engaged with the non-circular portion of the spool shaft and a retaining member fowled on the perimeter of the engagement hole, the bearing member being made of synthetic resin and disposed between the spool shaft and an inner surface of the shaft support member so as to rotatably support the spool unit, the retaining member protruding radially inward of the engagement hole and towards an axis of the spool shaft.

2. The spool according to claim 1, wherein the non-circular portion includes a groove on an outer periphery thereof, the groove being arranged in the circumferential direction of the non-circular portion.

3. The spool according to claim 2, wherein the bearing member being configured to interlock with the groove.

4. The spool according to claim 2, wherein the engagement hole includes a substantially oblong shape.

5. The spool according to claim 3, wherein the
   retaining member is formed on the inner periphery of the engagement hole at one end of the bearing member.

\* \* \* \* \*